(12) United States Patent
Dotan et al.

(10) Patent No.: US 9,078,129 B1
(45) Date of Patent: Jul. 7, 2015

(54) KNOWLEDGE-BASED AUTHENTICATION FOR RESTRICTING ACCESS TO MOBILE DEVICES

(71) Applicant: EMC Corporation, Hopkinton, MA (US)

(72) Inventors: Yedidya Dotan, Newton, MA (US); Ayelet Levin, Newton, MA (US); Ayelet Avni, Binyamina (IL); Boris Kronrod, Netania (IL)

(73) Assignee: EMC Corporation, Hopkinton, MA (US)

( * ) Notice: Subject to any disclaimer, the term of this patent is extended or adjusted under 35 U.S.C. 154(b) by 39 days.

(21) Appl. No.: 13/625,418

(22) Filed: Sep. 24, 2012

(51) Int. Cl.
*G06F 17/30* (2006.01)
*H04W 12/06* (2009.01)
*H04L 9/32* (2006.01)

(52) U.S. Cl.
CPC ............. *H04W 12/06* (2013.01); *H04L 9/3271* (2013.01)

(58) Field of Classification Search
CPC ..... H04W 12/06; H04L 9/3271; G06Q 20/40; G06F 2221/2103; G06F 2221/2119; G06F 21/31–21/32; G06F 17/30867
See application file for complete search history.

(56) References Cited

U.S. PATENT DOCUMENTS

| | | | |
|---|---|---|---|
| 7,698,242 B2 * | 4/2010 | Van Camp et al. | 706/45 |
| 8,401,522 B2 * | 3/2013 | Crawford et al. | 455/411 |
| 8,412,938 B2 * | 4/2013 | Farrugia et al. | 713/168 |
| 8,499,342 B1 * | 7/2013 | Macwan | 726/7 |
| 2008/0288299 A1 * | 11/2008 | Schultz | 705/4 |
| 2009/0007245 A1 * | 1/2009 | Schultz | 726/5 |
| 2009/0265773 A1 * | 10/2009 | Schultz | 726/7 |
| 2009/0305670 A1 * | 12/2009 | DeBoer et al. | 455/411 |
| 2010/0250955 A1 * | 9/2010 | Trevithick et al. | 713/185 |
| 2012/0180124 A1 * | 7/2012 | Dallas et al. | 726/22 |
| 2013/0160088 A1 * | 6/2013 | McFarland | 726/4 |
| 2013/0227651 A1 * | 8/2013 | Schultz et al. | 726/4 |
| 2013/0269013 A1 * | 10/2013 | Parry et al. | 726/7 |

\* cited by examiner

*Primary Examiner* — Fatoumata Traore
*Assistant Examiner* — Khoi Le
(74) *Attorney, Agent, or Firm* — BainwoodHuang (57) ABSTRACT

An improved technique involves authenticating a user requesting access to a particular mobile device using knowledge-based authentication (KBA) questions generated from data taken from a group of mobile devices to which the particular mobile device belongs. Along these lines, consider a corporation that has a group of mobile devices distributed to its employees. The mobile devices provide data to an enterprise KBA (eKBA) server regarding events on each of the mobile devices. Because an owner of a mobile device belongs to a group of employees, the owner is able to answer questions regarding fellow employees. On the other hand, a malicious user that illegitimately gains access to the owner's mobile device will not be able to answer such questions, even if the malicious user knows details about the owner.

22 Claims, 4 Drawing Sheets

Question Types:

| Meetings: | X | All | | Private | | Work |
|---|---|---|---|---|---|---|
| Location Data: | | All | X | Of Meetings | | |
| Emails: | | All | | Private | X | Work |
| Browsing History: | X | | | | | |
| Youtube History: | | | | | | |
| App Info: | X | All | | Private | | Work |
| Call info: | | All | X | Private | | Work |

82 ↘

Question Difficulty

[▓][▓][▓][▓][▓][▓][ ]

Only spouse should answer correctly

KNOWLEDGE-BASED AUTHENTICATION FOR RESTRICTING ACCESS TO MOBILE DEVICES

BACKGROUND

Mobile devices such as smartphones and tablets store sensitive data. For example, a mobile device may store financial information such as bank account numbers which belong to the owner of the mobile device. As another example, a smartphone may store business secrets within emails and other documents which belong to a corporation for which the owner of the mobile device works.

A conventional approach to controlling access to sensitive data on a mobile device involves requiring an owner to enter a password when the mobile device emerges from a "sleep" or a "power off" state. The owner of the mobile device enters a password known only to the owner into the mobile device, where the password is stored in memory. The password is not erased until the owner changes the password. The owner must know the password in order to make any changes to the password.

In some situations, the owner grants a trusted party the right to restore the password through either knowledge of the password or an ability to reset the device. In this situation, the conventional approach allows for the trusted party to access sensitive data in the event that the owner forgets the password.

SUMMARY

Unfortunately, there are deficiencies with the above-described conventional approach to controlling access to sensitive data on a mobile device. For example, fraudulent users may steal or guess passwords with relative ease. Further, owners of mobile devices frequently forget their passwords. In order to gain access to their devices, these owners rely on other, potentially untrustworthy, parties to restore their access.

In contrast to conventional approaches to controlling access to sensitive data on a mobile device which rely on passwords, an improved technique involves authenticating a user requesting access to a particular mobile device using knowledge-based authentication (KBA) questions generated from data taken from a group of mobile devices to which the particular mobile device belongs. Along these lines, consider a corporation that has a group of mobile devices distributed to its employees. The mobile devices provide data to an enterprise KBA (eKBA) server regarding events on each of the mobile devices. Because an owner of a mobile device belongs to a group of employees, the owner is able to answer questions regarding fellow employees. On the other hand, a malicious user that illegitimately gains access to the owner's mobile device will not be able to answer such questions, even if the malicious user knows details about the owner.

For example, suppose that a mobile device associated with User A provides calendar data detailing a meeting at Location A at Time A and involving User B and User C. Also suppose that a mobile device associated with User B provides GPS data stating that, at Time A, he was not at Location A but was, in fact, at Location B distant from Location A. Further suppose that a malicious user steals User C's mobile device and attempts to access a resource on it. In attempting to access User C's mobile device, the malicious user receives a KBA question asking about the participants at the meeting. Even if the malicious user gets access to User C's calendar on User C's mobile device, the malicious user is likely to assume that User A and User B were at the meeting with User C, whereas the correct answer to the KBA question is that only User A was at the meeting with User C. In this case, a risk of allowing the malicious user to access the resource on User C's mobile device decreases.

Advantageously, the improved technique prevents a hacker from being able to access valuable resources on a mobile device based only on information gleaned from that particular mobile device. Rather, authentication of a particular user as being allowed to access such resources is based on data from other mobile devices belonging to users with whom the particular user interacts. In this way, such a hacker would have to access each mobile device in the group in order to glean all of the data used to form questions. The likelihood of such a breach of security is very small, so that unauthorized persons would be almost certainly not be able to provide consistently correct answers to the questions.

One embodiment of the improved technique is directed to a method of authenticating a user on a particular mobile device. The method includes receiving facts from a group of mobile devices, the group of mobile devices including the particular mobile device, the facts including references to an owner of each mobile device of the group of mobile devices. The method also includes generating a set of KBA questions from the facts. The method further includes receiving a request from the user to access the particular mobile device. The method further includes presenting questions of the set of KBA questions to the user in response to receiving the request. The method further includes obtaining answers from the user to the questions. The method further includes performing a KBA operation configured to produce an authentication result from the answers, the user being granted or denied access to the particular mobile device based on the authentication result.

Additionally, some embodiments of the improved technique are directed to a system constructed and arranged to authenticate a user on a particular mobile device. The system includes a network interface, memory, and a controller including controlling circuitry constructed and arranged to carry out the method of authenticating a user on a particular mobile device.

Furthermore, some embodiments of the improved technique are directed to a computer program product having a non-transitory computer readable storage medium which stores code including a set of instructions to carry the method of authenticating a user on a particular mobile device.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves authenticating a user requesting access to a particular mobile device using knowledge-based authentication (KBA) questions generated from data taken from a group of mobile devices to which the particular mobile device belongs. Along these lines, consider a corporation that has a group of mobile devices distributed to its employees. The mobile devices provide data to an enterprise KBA (eKBA) server regarding events on each of the mobile devices. Because an owner of a mobile device belongs to a group of employees, the owner is able to answer questions regarding fellow employees. On the other hand, a malicious user that illegitimately gains access to the owner's mobile device will not be able to answer such questions, even if the malicious user knows details about the owner.

Advantageously, the improved technique prevents a hacker from being able to access valuable resources on a mobile device based only on information gleaned from that particular mobile device. Rather, authentication of a particular user as being allowed to access such resources is based on data from other mobile devices belonging to users with whom the particular user interacts. In this way, such a hacker would have to access each mobile device in the group in order to glean all of the data used to form questions. The likelihood of such a breach of security is very small, so that unauthorized persons would be almost certainly not be able to provide consistently correct answers to the questions.

Figure 1:
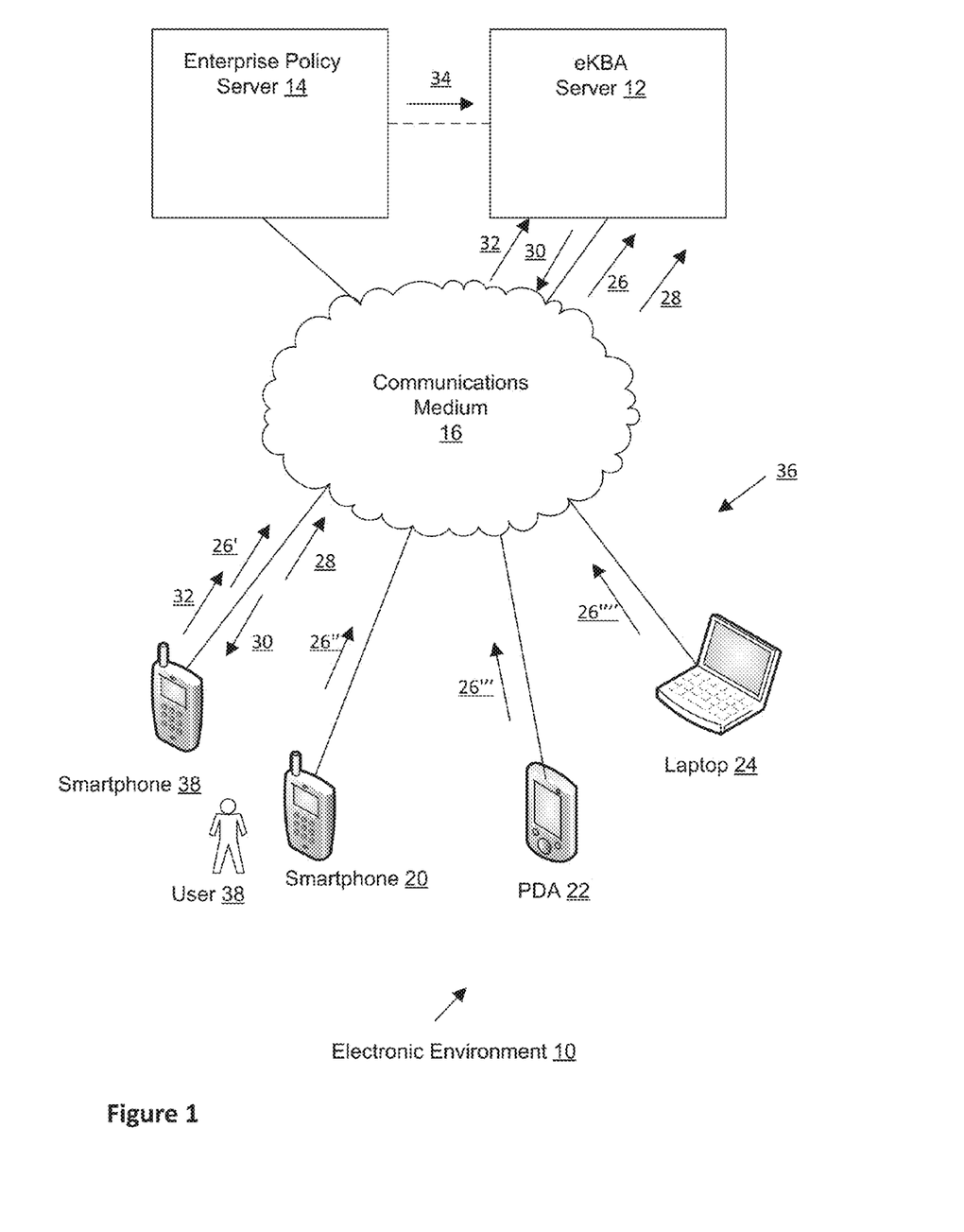
FIG. 1 is a block diagram illustrating an example electronic environment for carrying out the improved technique.

FIG. 1 illustrates an example electronic environment 10 for carrying out the improved technique. Electronic environment 10 includes eKBA server 12, enterprise policy server 14, communications medium 16, smartphones 18 and 20, PDA 22, and laptop 24.

Communication medium 16 provides network connections between eKBA server 12, enterprise policy server 14, smartphones 18 and 20, PDA 22, and laptop 24.

Communications medium 16 may implement a variety of protocols such as TCP/IP, UDP, ATM, Ethernet, Fibre Channel, combinations thereof, and the like. Furthermore, communications media 16 may include various components (e.g., cables, switches/routers, gateways/bridges, NAS/SAN appliances/nodes, interfaces, etc.). Moreover, the communications medium 16 are capable of having a variety of topologies (e.g., queue manager-and-spoke, ring, backbone, multi drop, point to-point, irregular, combinations thereof, and so on).

Smartphones 18 and 20, PDA 22, and laptop 24 are examples of mobile devices that form a group of mobile devices 36. Each of the mobile devices of group 36 are constructed and arranged to provide data to eKBA server 12 via communication medium 16 at various times, e.g. periodically or in response to various events. Each of these mobile devices of group 36 is outfitted with email and calendar programs that provide the data to eKBA server 12. In some arrangements, some mobile devices of group 36 include a GPS device for tracking position, a gyroscopic device for detecting speed, and/or a browser for accessing web pages.

eKBA server 12 is constructed and arranged to receive and store data from mobile devices of group 36. eKBA server 12 is also constructed and arranged to form KBA questions from the data for use when, for example, user 26 requests access to resources on smartphone 18. eKBA server 12 is further constructed and arranged to receive answers to KBA questions and provide an authentication result based on the answers.

Policy server 14 is constructed and arranged to define a policy with respect to the KBA questions that eKBA server 12 may present to users of mobile devices in group 36. For example, policy server 14 supplies rules to eKBA server 12 governing the difficulty of questions asked to particular users. Other rules may govern the types of questions eKBA server 12 is able to ask particular user, or the types of data eKBA server 12 is able to use in generating KBA questions.

During operation, eKBA server 12 receives facts 26 from mobile devices of group 36. For example, eKBA server 12 receives geolocation data from smartphone 18 via a GPS device. Such data would take the form of a fact: "The user of smartphone 18 was at Location A on Wednesday at 2:00 PM." In another example, eKBA server 12 receives calendar data from laptop 24. Such data would take the form of a fact: "The user of laptop 24 has scheduled a meeting with User A and User B at Location B on Wednesday at 2:00 PM."

It should be understood that, in some arrangements, mobile devices of group 36 send facts 26 to eKBA server 12 in response to various event triggers. For example, smartphone 18 sends the fact 26' when the GPS device detects that the user is at a particular position (e.g., Location A); laptop 24 sends the fact 26"" when the user of laptop 24 creates the calendar entry.

It should also be understood that other triggers can send facts 26 to eKBA server 12. For example, a gyroscopic device in smartphone 20 can send fact 26" when the gyroscopic device detects smartphone 20 moving faster than some threshold speed. Alternatively, a web browser in PDA 22 can send fact 26''' when the web browser access a particular website or YouTube video. Data 34 from enterprise policy server 14 specifies such threshold speeds or particular websites. In some arrangements, eKBA server 12 receives data 34 periodically (e.g., nightly).

It should further be understood that facts 26 includes references to owners of the mobile devices in group 36. For example, the fact "The user of laptop 24 has scheduled a meeting with User A and User B at Location B on Wednesday at 2:00 PM" has a reference to User A and User B, each of which owns a mobile device of group 36.

Figure 2:
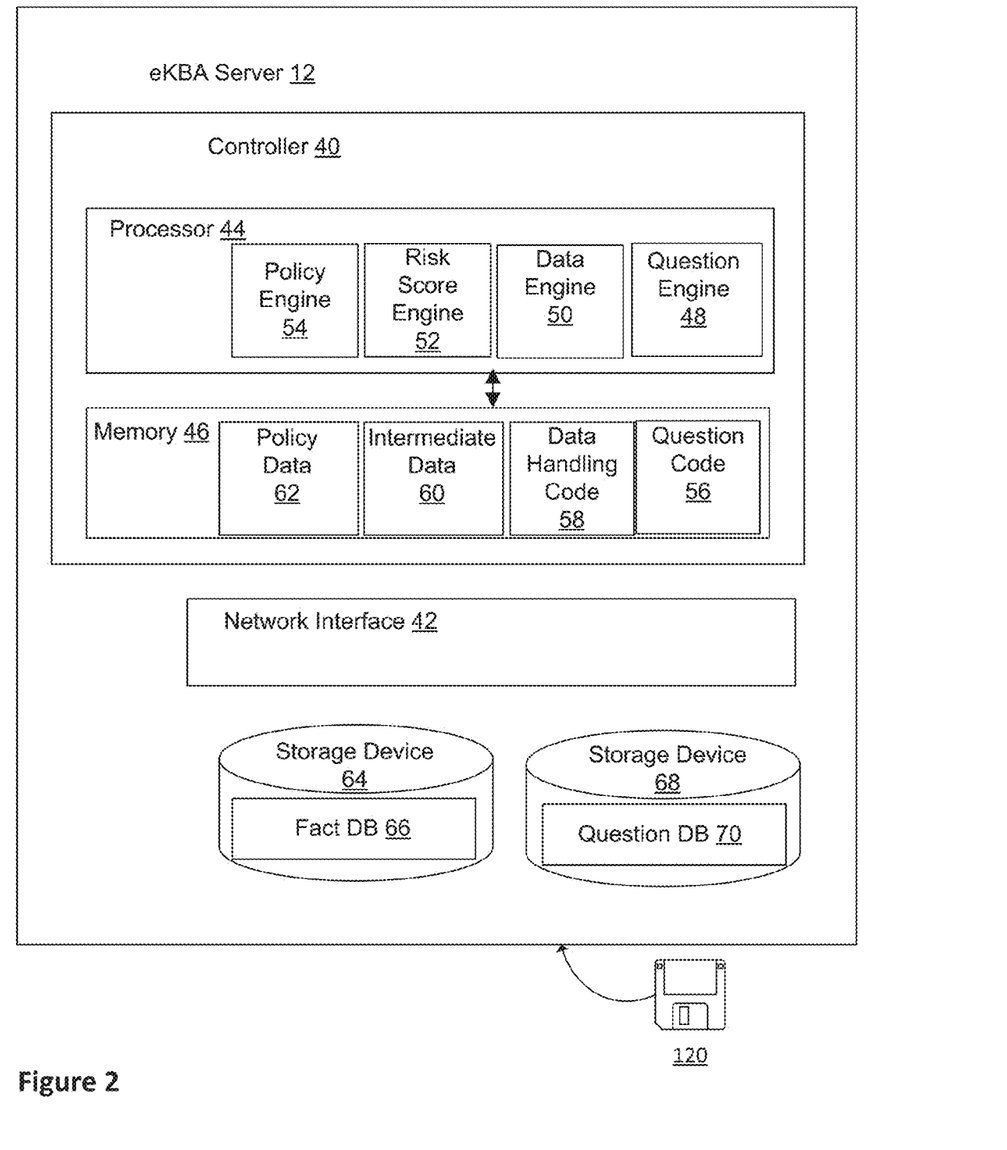
FIG. 2 is a block diagram illustrating an example eKBA server within the electronic environment shown in FIG. 1.

Upon receiving facts 26, eKBA server 12 stores facts 26 on a facts database 66 (see FIG. 2). eKBA server 12 then generates a set of questions 30 from facts 26 in facts database 66 and stores questions 30 in questions database 70 (see FIG. 2). It should be understood that, in some arrangements, eKBA server 12 operates within a massively parallel processing (MPP) environment. For example, fact database 66 and question database 70 each may take the form of a relational database (e.g., Greenplum, offered by EMC Corp. of Hopkinton, Mass.), a file-based NoSQL database (Hadoop, offered by EMC Corp. of Hopkinton, Mass.), or a column-oriented NoSQL database (Cassandra, offered by EMC Corp. of Hopkinton, Mass.).

Sometime later, eKBA server 12 receives a request 28 to access resources on a mobile device of group 36 (e.g., smartphone 18). In some arrangements, request 28 includes a username and password; in some further arrangements, user 26 sent request 28 via a user interface on smartphone 18.

In response to receiving request 28, eKBA server 12 presents questions 30 from those stored on questions database 70. In some arrangements, eKBA server 12 ranks questions 30 according to suitability. For example, eKBA server 12 provides a high rank to those questions generated from facts 26 having references to the owner of smartphone 18, and a low rank to those questions generated from facts having references to people unrelated to the owner of smartphone 18. In this case, eKBA server would send the highest-ranked questions 30 to user 38.

eKBA server 12 then receives answers 32 to questions 30. In some arrangements, eKBA server 12 receives answers 32 as they are entered by user 38; in other arrangements, eKBA server 12 receives all answers 32 at once.

Based on the received answers 32, eKBA server 12 performs a KBA operation to determine whether user 38 should be granted or denied access to resources on smartphone 18. In some arrangements, such a KBA operation entails computing a value of a risk score. eKBA server 12 would increase the value of the risk score when answers 32 to questions 30 are incorrect, and decrease the value of the risk score when answers 32 to questions 30 are correct. When the value of the risk score is less than a threshold value, then eKBA server 12 grants access to user 38; when the value of the risk score is greater than a threshold value, then eKBA server 12 denies access to user 38.

Further details of eKBA server are described below with respect to FIG. 2.

FIG. 2 illustrates eKBA server 12. eKBA server 12 includes controller 40, which in turn includes processor 44 and memory 46, network interface 42, and storage devices 64 and 68 which store, respectively, fact database 66 and question database 70. In some arrangements, fact database 66 and question database 70 are stored on a single storage device.

Network interface 42 takes the form of an Ethernet card; in some arrangements, network interface 42 takes other forms including a wireless receiver and a token ring card.

Memory 46 is configured to store code which includes question code 56 configured to generate a set of questions 30 from facts 26 (see FIG. 1) stored in facts database 66 on storage device 64. Questions 30, in turn, are stored in questions database 70 on storage device 68. Memory 46 also includes space for intermediate data 60, in which intermediate results of question building are stored. Memory 46 further includes data handling code 58 for handling facts supplied by mobile devices of group 36. Memory 46 further includes policy data 62 from policy server 14. Memory 46 generally takes the form of, e.g., random access memory, flash memory or a non-volatile memory.

Processor 44 takes the form of, but is not limited to, Intel or AMD-based MPUs, and can include a single or multi-cores each running single or multiple threads. Processor 44 is coupled to memory 46 and is configured to execute instructions from question code 56 and data handling code 58. Processor 48 includes question engine 48, data engine 50, risk score engine 52, and policy engine 54.

During operation, processor 44 receives fact 26 (see FIG. 1) via network interface 42 and stores fact 26 in database 66 on storage device 64. In some arrangements, processor 44 receives different types of facts 26 in different formats. For example, while a fact 26 from a calendar application from laptop 24 may be compatible with a Microsoft® Exchange server, a fact 26 from a calendar application on smartphone 18 may be compatible with a CalDav server. In such a case, data engine 50 may put such facts 26 into a common format before storing facts 26 onto database 66. In other arrangements, however, processor 44 puts facts 26 in raw format on a NoSQL database 66.

Policy engine 54 within processor 44 receives policies 34 (see FIG. 1) from policy server 14 and stores policies 34 in policy data 62 in memory 46. In some arrangements, policies 34 include a set of rules for generating questions 30 from facts 26. For example, a set of rules may require questions be difficult enough to be answered only by user 28; others would allow questions to be answerable by a spouse of user 28. Further details of an example policy 34 are described below with respect to FIG. 3.

Figure 3:
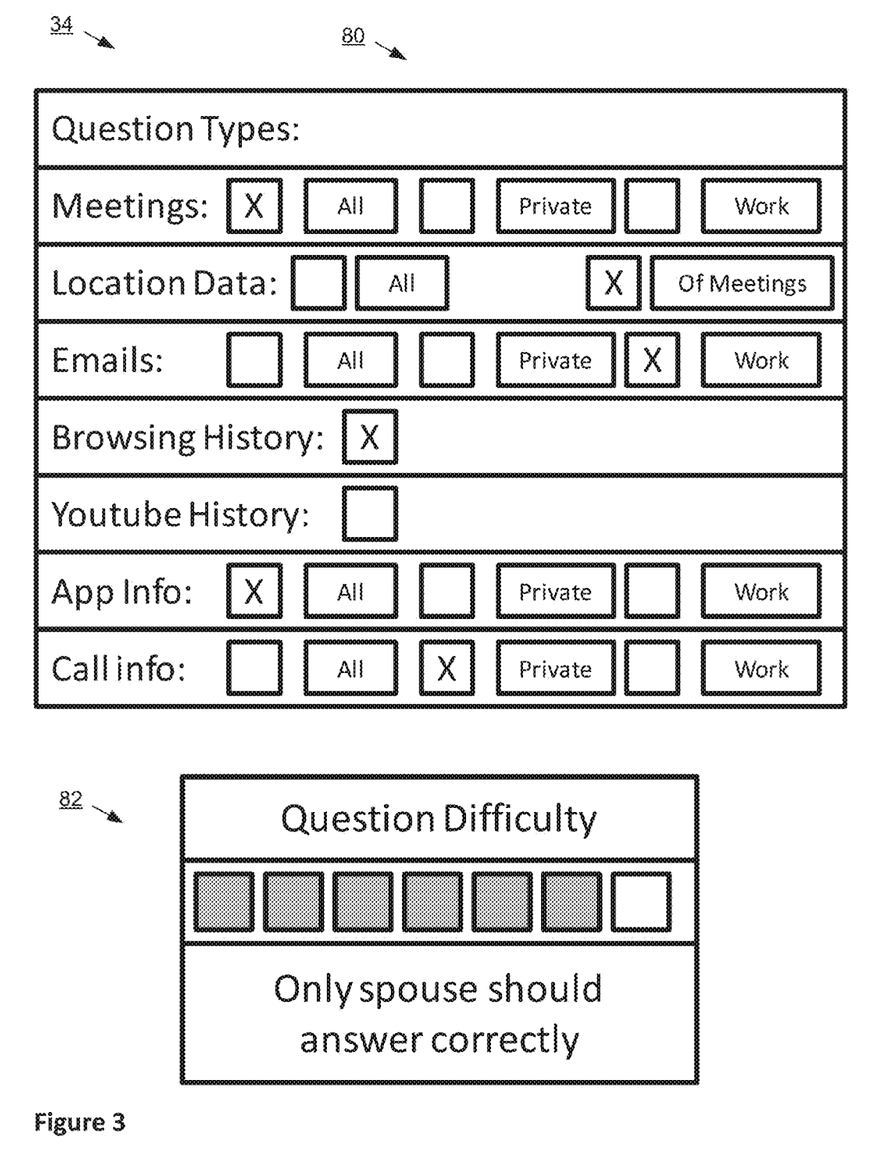
FIG. 3 is a block diagram illustrating an example policy generated within the policy server shown in FIG. 1.

FIG. 3 illustrates details of an example policy 34. In this case, the example policy 34 is determined by an owner of a mobile device of group 36 and appears as it would when displayed on a display device of the mobile device. Policy 60 includes example policy data table 80 and example policy difficulty meter 90, which the mobile device sends to policy server 14. In some arrangements, however, an enterprise determines policy 34.

Policy data table 80 includes entries corresponding to permissions regarding categories of KBA questions 30 (see FIG. 1) allowed to be sent to user 38. The categories of KBA questions in policy data table 80 include meetings, location data, emails, browsing history, YouTube history, app data, and phone call data. Facts 26 are, in some arrangements, tagged with appropriate keywords (e.g., "work") for applying permissions.

The meetings and email categories include a filter for choosing whether only those meetings that are marked "Work" or "Private." For example, the owner may not wish to expose sensitive information about his or her company's meetings; in this case, the owner would put an "X" in the "Private" option.

The Location Data category differentiates between simply locations of meetings (i.e., for business) or other locations.

App Info and Call Info categories also include a filter for choosing whether only those meetings that are marked "Work" or "Private."

Further, browsing history and YouTube history can be included or excluded with a single checkbox.

Policy difficulty meter 90 represents a measure of how difficult the questions 32 (see FIG. 1) should be. For example, the owner of mobile apparatus 12 sets policy difficulty meter 90 to a difficult level (e.g., six out of seven) in order to ensure that, in all likelihood, only a spouse could guess enough correct answers 40 (see FIG. 1) to be granted access to resources 26 (see FIG. 1). Question selection engine 56 selects KBA questions 30 satisfying a particular difficulty level based on factors including age of facts in question, references to other users (e.g., coworkers, relatives, etc.), and question category (e.g., asking a definition from a Wikipedia website visit).

Returning to FIG. 2, question engine 48 generates KBA questions 30 from facts 26 in database 66. Once question engine 48 generates questions 30, processor 48 stores questions 30 in question database 70 on storage device 68. It should be understood that question database 68 is, in some arrangements, a relational database in which questions 30 may be ranked according to criteria in a policy 34.

Sometime later, processor 48 receives request 28 from user 38 and stores request 28 in intermediate data 60 in memory 46. In some arrangements, request includes 28 includes an identifier of the owner of the mobile device of group 36 as well as an identifier of the resources that user 28 wishes to access.

Processor 48 accesses policy 34 in policy data 62 and selects questions 30 to ask user 38 based on policy 34. For example, processor 48 ranks questions 30 in database 70 according to rules in policy 34; processor 48 then selects the top several questions 30 to send to user 28.

Processor 48 sends selected questions 30 to user 38 and subsequently receives answers 32. Processor 48 then compares answers 32 to correct answers stored in question database 70. Risk score engine 70 computes a risk score value based on the comparison, and processor 48 grants or denies access to the resource based on the risk score value.

Figure 4:
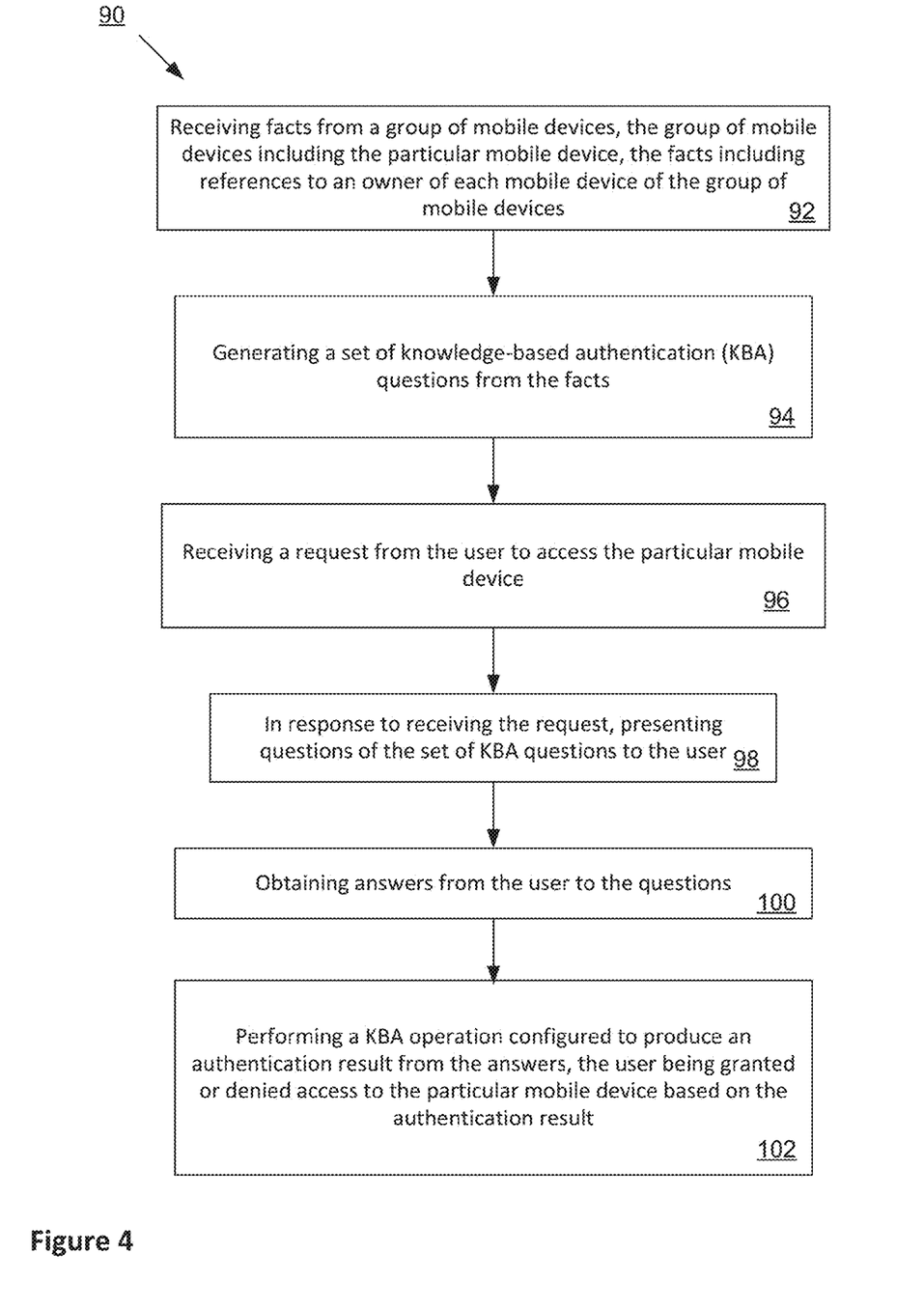
FIG. 4 is a flow chart illustrating a method of carrying out the improved technique within the electronic environment shown in FIG. 1.

FIG. 4 illustrates a method 90 of authenticating a user on a particular mobile device. In step 92, facts from a group of mobile devices are received, the group of mobile devices including the particular mobile device, the facts including references to an owner of each mobile device of the group of mobile devices. In step 94, a set of knowledge-based authentication (KBA) questions are generated from the facts. In step 96, a request from the user to access the particular mobile device is received. In step 98, questions of the set of KBA questions are presented to the user in response to receiving the request. In step 100, answers are obtained from the user to the questions. In step 102, a KBA operation configured to produce an authentication result from the answers is performed, the user being granted or denied access to the particular mobile device based on the authentication result.

While various embodiments of the invention have been particularly shown and described, it will be understood by those skilled in the art that various changes in form and details may be made therein without departing from the spirit and scope of the invention as defined by the appended claims.

For example, while mobile devices of group 36 include smartphones, PDAs, and laptops, it should be understood that the improved technique allows any mobile devices capable of sending data that may be used as facts 26. Such devices include tablet computers, netbooks, and the like.

Furthermore, it should be understood that some embodiments are directed to eKBA system 12, which is constructed and arranged to authenticate a user on a particular mobile device. Some embodiments are directed to a process of authenticating a user on a particular mobile device. Also, some embodiments are directed to a computer program product which enables computer logic to authenticate a user on a particular mobile device.

In some arrangements, eKBA server 12 is implemented by a set of processors or other types of control/processing circuitry running software. In such arrangements, the software instructions can be delivered, within eKBA server 12, respectively (see FIG. 2), in the form of a computer program product 120, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of authenticating a user operating a particular mobile device, the method comprising:
   receiving facts from a group of mobile devices, the group of mobile devices including the particular mobile device, the facts describing events involving the user;
   generating, at a knowledge-based authentication (KBA) server, a set of KBA questions from the facts;
   receiving a request from the user to access protected resources stored locally in the particular mobile device while the user operates the particular mobile device;
   in response to receiving the request, presenting at least one question of the set of KBA questions to the user, the at least one question challenging the user's knowledge of an event described by the facts;
   obtaining at least one answer from the user to the at least one question, the at least one answer signifying the user's knowledge of the event described by the facts; and
   generating an authentication result from the at least one answer, the user being granted or denied access to the protected resources stored locally in the particular mobile device based on the authentication result;
   wherein the events involving the user include a scheduling of a meeting between the user and a coworker;
   wherein presenting the at least one question of the set of KBA questions to the user includes sending the user a question concerning an actual time at which the meeting was scheduled;
   wherein obtaining the at least one answer from the user to the at least one question includes receiving a selected time at which the user may have scheduled the meeting; and
   wherein generating the authentication result includes comparing the selected time to the actual time;
   wherein presenting the at least one question of the set of KBA questions to the user further includes sending the user another question concerning an actual identity of the coworker;
   wherein obtaining the at least one answer from the user to the at least one question further includes receiving a selected identity of the coworker; and
   wherein generating the authentication result further includes comparing the selected identity to the actual identity.

2. The method as in claim 1, further comprising:
   after receiving the facts, storing the facts in a column-oriented, No-SQL database;
   wherein generating the set of KBA questions includes:
   performing a set of massive multi-processing operations on the facts stored in the column-oriented, No-SQL database; and
   wherein presenting the at least one question includes:
   sending the at least one question to the particular device over a network.

3. The method as in claim 2,
   wherein the group of mobile devices is part of an enterprise having a policy;
   wherein generating the set of KBA questions includes:
   selecting KBA questions of the set of KBA questions based on the policy.

4. The method as in claim 3,
   wherein the policy includes rules configured to control i) permissions regarding categories of KBA questions allowed to be sent to the user, and ii) a level of difficulty associated with the KBA questions sent to the user, and
   wherein presenting the at least one question further includes:
   applying the policy to the set of KBA questions to produce the selected questions.

5. The method as in claim 4,
   wherein the policy further includes additional rules configured to control permissions regarding additional categories of KBA questions allowed to be sent to the user, the additional rules being generated by an electronic computing system remote from the group of mobile devices, and
   wherein presenting the at least one question to the user further includes:
   receiving information associated with the additional rules via a network interface of the particular mobile device.

6. The method as in claim 2,
   wherein each mobile device of the group of mobile devices further includes a trigger configured to create events in the mobile device,
   wherein the facts stored in the column-oriented, No-SQL database includes event data produced upon an occurrence of a trigger-based event created by the trigger, and
   wherein receiving the facts from the group of mobile devices includes:
   collecting event data upon the occurrence of the trigger-based event.

7. The method as in claim 6,
   wherein the trigger includes a global positioning system (GPS) device, wherein the trigger-based event is location data derived from the GPS device corresponding to a particular location, and wherein collecting the event data upon the occurrence of the trigger-based event includes:

receiving, as the event data, mobile device location data derived from the GPS device.

8. The method as in claim 7, wherein the trigger includes a gyroscopic device, wherein the trigger-based event is a speed associated with motion of the mobile apparatus detected by the gyroscope exceeding a threshold speed, and wherein collecting the event data upon the occurrence of the trigger-based event includes:

receiving, as the event data, mobile device path data derived from the GPS device and the gyroscopic device.

9. The method as in claim 6, wherein the trigger includes a web browser, wherein the trigger-based event is the web browser accessing a particular website, and wherein collecting the event data upon the occurrence of the trigger-based event includes:

receiving, as the event data, facts derived from the particular website.

10. The method as in claim 2, wherein receiving the facts from the group of mobile devices includes:

obtaining facts from each mobile device of the group of mobile devices after a specified periodic time interval.

11. A system constructed and arranged to authenticate a user operating a particular mobile device, the system comprising, a network interface;

memory; and a controller including controlling circuitry coupled to the memory, the controlling circuitry being constructed and arranged to:

receive facts from a group of mobile devices, the group of mobile devices including the particular mobile device, the facts describing event involving the user;

generate, at a knowledge-based authentication (KBA) server, a set of KBA questions from the facts;

receive a request from the user to access protected resources stored locally in the particular mobile device while the user operates the particular mobile device;

in response to receiving the request, present at least one question of the set of KBA questions to the user, the at least one question challenging the user's knowledge of an event described by the facts;

obtain at least one answer from the user to the at least one question, the at least one answer signifying the user's knowledge of the event described by the facts; and generate an authentication result from the at least one answer, the user being granted or denied access to the protected resources stored locally in the particular mobile device based on the authentication result;

wherein the events involving the user include a scheduling of a meeting between the user and a coworker;

wherein the controlling circuitry constructed and arranged to present the at least one question of the set of KBA questions to the user is further constructed and arranged to send the user a question concerning an actual time at which the meeting was scheduled;

wherein the controlling circuitry constructed and arranged to obtain the at least one answer from the user to the at least one question is further constructed and arranged to receive a selected time at which the user may have scheduled the meeting; and wherein the controlling circuitry constructed and arranged to generate the authentication result is further constructed and arranged to compare the selected time to the actual time;

wherein the controlling circuitry constructed and arranged to present the at least one question of the set of KBA questions to the user is further constructed and arranged to sending the user another question concerning an actual identity of the coworker;

wherein the controlling circuitry constructed and arranged to obtain the at least one answer from the user to the at least one question is further constructed and arranged to receive a selected identity of the coworker; and wherein the controlling circuitry constructed and arranged to generate the authentication result is further constructed and arranged to compare the selected identity to the actual identity.

12. The system as in claim 11, wherein the controlling circuitry is further constructed and arranged to:

after receiving the facts, store the facts in a column-oriented, No-SQL database; and wherein the controlling circuitry constructed and arranged to generate the set of KBA questions is further constructed and arranged to:

perform a set of massive multi-processing operations on the facts stored in the column-oriented, No-SQL database; and wherein the controlling circuitry constructed and arranged to present the at least one question is further constructed and arranged to:

send the at least one question to the particular device over a network.

13. The system as in claim 12, wherein the group of mobile devices is part of an enterprise having a policy;

wherein the controlling circuitry constructed and arranged to generate the set of KBA questions is further constructed and arranged to:

select KBA questions of the set of KBA questions based on the policy.

14. The system as in claim 13, wherein the policy includes rules configured to control i) permissions regarding categories of KBA questions allowed to be sent to the user, and ii) a level of difficulty associated with the KBA questions sent to the user, and wherein the controlling circuitry constructed and arranged to present the at least one question is further constructed and arranged to:

apply the policy to the set of KBA questions to produce the selected questions.

15. The system as in claim 14, wherein the policy further includes additional rules configured to control permissions regarding additional categories of KBA questions allowed to be sent to the user, the additional rules being generated by an electronic computing system remote from the group of mobile devices, and wherein the controlling circuitry constructed and arranged to present the at least one question to the user is further constructed and arranged to:

receive information associated with the additional rules via a network interface of the particular mobile device.

16. A computer program product having a non-transitory, computer-readable storage medium which stores code to authenticate a user operating a particular mobile device, the code including instructions to:

receive facts from a group of mobile devices, the group of mobile devices including the particular mobile device, the facts describing events involving the user;

generate, at a knowledge-based authentication (KBA) server, a set of KBA questions from the facts;

receive a request from the user to access protected resources stored locally in the particular mobile device while the user operates the particular mobile device;

in response to receiving the request, present at least one question of the set of KBA questions to the user, the at least one question challenging the user's knowledge of an event described by the facts;

obtain at least one answer from the user to the at least one question, the at least one answer signifying the user's knowledge of the event described by the facts; and generate an authentication result from the at least one answer, the user being granted or denied access to the protected resources stored locally in the particular mobile device based on the authentication result;

wherein the events involving the user include a scheduling of a meeting between the user and a coworker;

wherein presenting the at least one question of the set of KBA questions to the user includes sending the user a question concerning an actual time at which the meeting was scheduled;

wherein obtaining the at least one answer from the user to the at least one question includes receiving a selected time at which the user may have scheduled the meeting; and wherein generating the authentication result includes comparing the selected time to the actual time;

wherein presenting the at least one question of the set of KBA questions to the user further includes sending the user another question concerning an actual identity of the coworker;

wherein obtaining the at least one answer from the user to the at least one question further includes receiving a selected identity of the coworker; and wherein generating the authentication result further includes comparing the selected identity to the actual identity.

17. The computer program product as in claim 16, wherein the code includes further instructions to:

after receiving the facts, store the facts in a column-oriented, No-SQL database;

wherein generating the set of KBA questions includes:
performing a set of massive multi-processing operations on the facts stored in the column-oriented, No-SQL database; and wherein presenting the at least one question includes:
sending the at least one question to the particular device over a network.

18. The computer program product as in claim 17, wherein the group of mobile devices is part of an enterprise having a policy;

wherein generating the set of KBA questions includes:
selecting KBA questions of the set of KBA questions based on the policy.

19. The computer program product as in claim 18, wherein the policy includes rules configured to control i) permissions regarding categories of KBA questions allowed to be sent to the user, and ii) a level of difficulty associated with the KBA questions sent to the user, and wherein presenting the at least one question further includes:
applying the policy to the KBA questions to produce the selected questions.

20. The computer program product as in claim 19, wherein the policy further includes additional rules configured to control permissions regarding additional categories of KBA questions allowed to be sent to the user, the additional rules being generated by an electronic computing system remote from the group of mobile devices, and wherein presenting the at least one question to the user further includes:
receiving information associated with the additional rules via a network interface of the particular mobile device.

21. The method as in claim 1, wherein presenting questions of the set of KBA questions to the user includes providing a rank to the set of KBA questions according to suitability of a KBA question, a high rank indicating more suitability than a low rank.

22. The method as in claim 21, wherein providing the rank to the set of KBA questions includes:

providing a high rank to KBA questions of the set of KBA questions generated from facts having references to the owner of the particular mobile device; and providing a low rank to KBA questions of the set of KBA questions generated from facts having references to people unrelated to the owner of the particular mobile device.

* * * * *